United States Patent [19]

Meyers

[11] Patent Number: 4,710,615
[45] Date of Patent: Dec. 1, 1987

[54] CCD BAR CODE SCANNER

[75] Inventor: Thomas J. Meyers, St. Clairsville, Ohio

[73] Assignee: NCR Corporation, Dayton, Ohio

[21] Appl. No.: 878,748

[22] Filed: Jun. 26, 1986

[51] Int. Cl.⁴ .............................................. G06K 7/10
[52] U.S. Cl. ..................................... 235/454; 235/467
[58] Field of Search ............................... 235/454, 467

[56] References Cited

U.S. PATENT DOCUMENTS

| | | |
|---|---|---|
| 3,418,456 | 12/1968 | Hamisch et al. |
| 3,474,234 | 10/1969 | Rieger et al. |
| 3,555,244 | 1/1971 | Spauszus et al. |
| 3,770,940 | 11/1973 | Harr |
| 3,886,328 | 5/1975 | Harms, Jr. et al. |
| 4,114,030 | 9/1978 | Nojiri et al. ........................ 235/464 |
| 4,135,663 | 1/1979 | Nojiri .................................. 235/454 |
| 4,140,271 | 2/1979 | Nojiri et al. ........................ 235/440 |
| 4,282,425 | 8/1981 | Chadima, Jr. et al. ............. 235/462 |
| 4,335,302 | 6/1982 | Robillard .............................. 235/462 |
| 4,356,513 | 10/1982 | Yoshimura et al. ................ 358/213 |
| 4,409,469 | 10/1983 | Yasuda et al. ..................... 235/463 |
| 4,411,016 | 10/1983 | Wakeland ............................ 382/62 |

Primary Examiner—Harold I. Pitts
Attorney, Agent, or Firm—Wilbert Hawk, Jr.; Albert L. Sessler, Jr.; Richard W. Lavin

[57] ABSTRACT

A system for scanning a bar code label includes a light source for projecting light beams at the label, a rotating disc member located in a path of the reflected light beams, an array of charge-coupled devices mounted on the disc member for storing electrical signals upon sensing the reflected light beams, circuit means mounted on the disc member for reading and processing the electrical signals, a plurality of light-emitting diodes mounted on the rotating disc member for outputting binary signals representing the electrical signals stored by the array, and a photodiode mounted adjacent the rotating disc member for reading the output of the light-emitting diodes for transferring the data to a central processor for processing the data.

11 Claims, 6 Drawing Figures

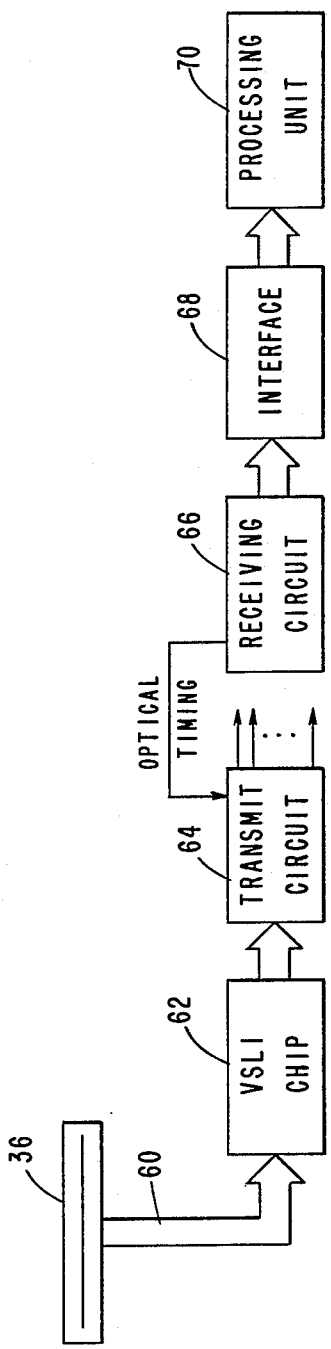

CCD BAR CODE SCANNER

BACKGROUND OF THE INVENTION

The present invention is directed to bar code scanners of the type used to read bar codes such as U.P.C. bar codes on package labels and more particularly to a bar code scanner of the type utilizing a plurality of self-scanning type solid photoelectric elements hereinafter referred to as charge-coupled devices (CCD).

In present-day merchandising point-of-sale operations, data pertaining to the merchandise item purchased is obtained by reading data encoded indicia such as a bar code printed on the merchandise item. In order to standardize the bar codes used in various point-of-sale readout systems, the grocery industry has adopted a Universal Product Code (UPC) which is in the form of a bar code. Various scanning systems have been constructed to read this bar code including hand held wands which are moved across the bar code and stationary optical reader systems normally located within the check-out counter in which the portion of the merchandise item containing the bar code is moved across a window, constituting the scanning area of the counter, which movement is a part of the check-out process just prior to loading the item in a bag or the like.

The stationary scanning systems presently available utilize a rotating mirror for generating a scan pattern used in reading the bar code. Examples of this type of scanning system may be found in U.S. Pat. Nos. 3,916,158, 3,995,166 and 4,057,784. Limitations of this type of scanning apparatus include tight mechanical requirements due to the high speed rotation of the mirror, which requirements limit the operating efficiency of such scanning apparatuses. In addition, this type of scanning apparatus by necessity is large in size and weight and therefore high in cost.

It is therefore, a principal object of this invention to provide an optical scanner which is compact in size and low in cost.

It is another object of this invention to provide an optical scanner which can operate without the use of a laser as a light source and can be remotely located from the data terminal associated with the scanning system.

SUMMARY OF THE INVENTION

In order to fulfill these objects, a scanning system is disclosed which includes an array of charge-coupled device (CCD) image sensors mounted on a rotating disc or support member located in the focal plane of a lens system receiving light reflected from the bar code label located on a merchandise item. The rotating disc or support member has also mounted thereon signal processing circuits for processing the data signals generated by the image sensors and representing the bar code on the merchandise items. The data signals read are transferred from the rotating support member to a processing device by a series of light-emitting diodes mounted on the rotating support member each of whose light output is sensed by a photodiode mounted on a stationary member position adjacent the rotating disc member. Each diode mounted on the rotating disc member outputs a signal representing a single binary bit of data. This data is then processed by circuits associated with the scanning system to be displayed and printed on a data terminal device.

BRIEF DESCRIPTION OF THE DRAWINGS

Additional advantages and features of the present invention will become apparent and fully understood from a reading of the following description, taken together with the annexed drawing in which:

FIG. 6 is a block diagram of the signal processing system of the present invention.

DESCRIPTION OF THE PREFERRED EMBODIMENT

Figure 1:
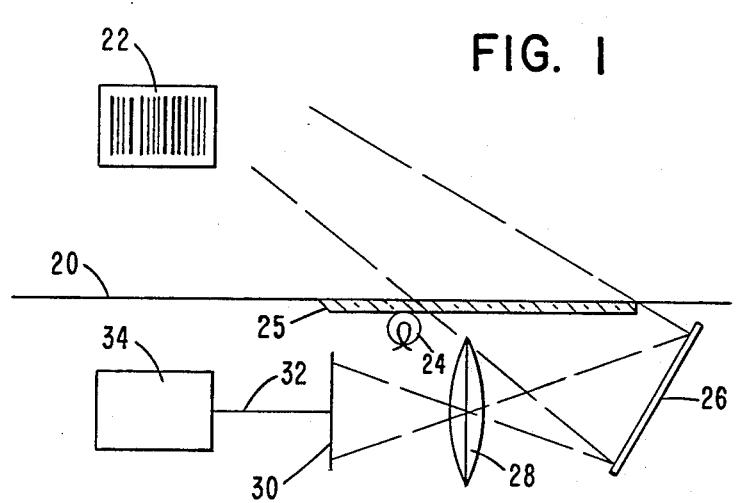
FIG. 1 is a schematic representation of a bar code scanning system showing one arrangement of the scanning apparatus of the present invention.
Figure 2:
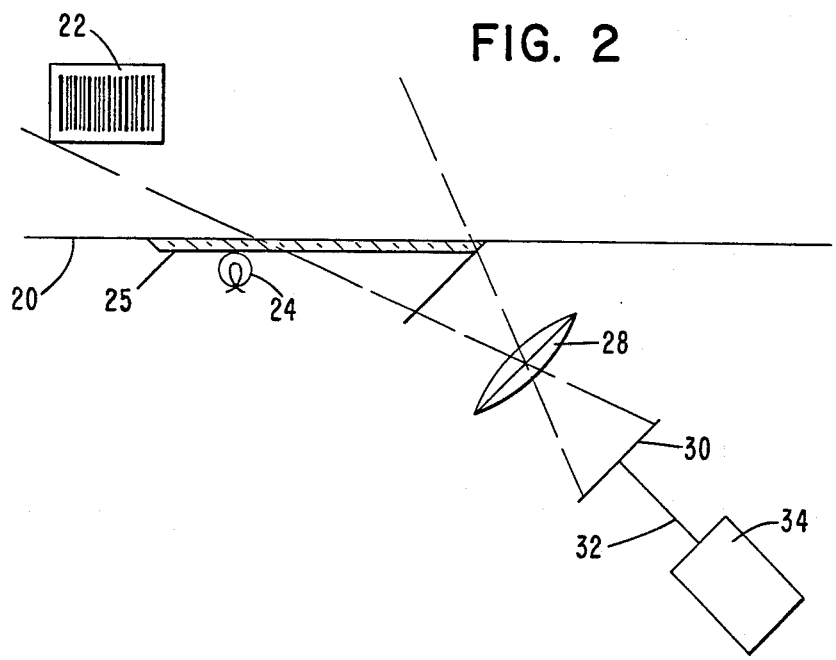
FIG. 2 is a schematic representation of a bar code scanning system showing a second arrangement of the scanning apparatus of the present invention.

Referring now to FIG. 1, there is shown a schematic representation of a bar code scanning apparatus of the present invention which includes a supporting surface 20 such as the top surface of a check-out counter over which is moved a purchased merchandise item on which is located a bar code label 22. As the merchandise item moves along the surface 20, light beams from a light source 24 located adjacent a window 25 located in the surface 20 will illuminate the label and be reflected back through the window to a mirror 26. The light beams will be reflected from the mirror 26 through a focusing lens 28 to a rotating disc or support member 30 which is positioned in the focal plane of the lens 28. The support member 30 has an upper surface 31 and a lower surface 33 and is connected to a motor 34 by a drive shaft 32 which rotates the support member 30. As will be described more fully hereinafter, an array 36 of charge-coupled devices mounted on the upper surface 31 of the support member 30 will store electrical signals representing the image of the bar code label in response to receiving the light beams from the lens 28. These signals are then transferred from the array 36 to processing means for processing the signals in a manner to be described more fully hereinafter. It will be seen that this arrangement allows the scanning apparatus to be mounted within a very compact area of the check-out counter. FIG. 2 of the drawings shows the scanning apparatus mounted where the available room requires a more vertical orientation of the scanning apparatus.

Figure 3:
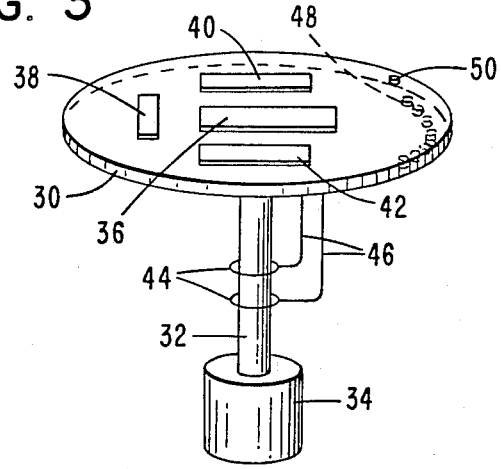
FIG. 3 is a schematic representation of an oblique view of the rotating disc member which supports the array of charge-coupled devices.
Figure 5:
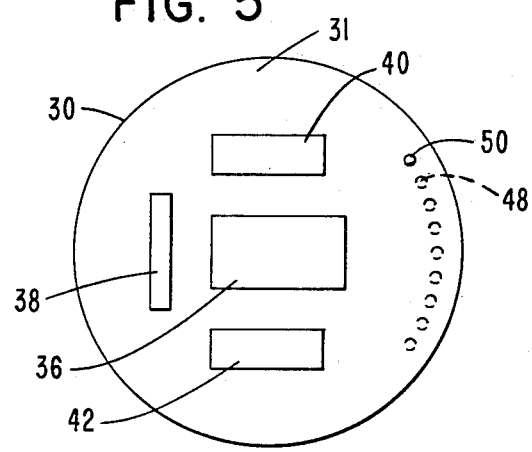
FIG. 5 is a schematic representation of a top view of the rotating member showing the location of the array of charge-coupled devices and the light emitting diodes.

Referring now to FIGS. 3 and 5, there are shown views of the rotating disc member 30 which may be composed of a thermoplastic material or other type of rigid structure and which supports the array 36 of charged-couple devices such as Fairchild CCD 133 which are commercially available from the Fairchild Camera Co. of 3440 Hillview Avenue, Pala Alto, Calif., 94304. Rotation of the array 36 allows the array to sense various locations of the bar code label. Also mounted on the disc member 30 are a number of IC chips 38–42 inclusive, comprising signal processing circuits for processing the signals stored by the array 36. A pair of slip rings 44 located on the drive shaft 34 provide power from a power source (not shown) over lines 46 to the array 36 and the IC chips 38-42 inclusive.

Figure 4:
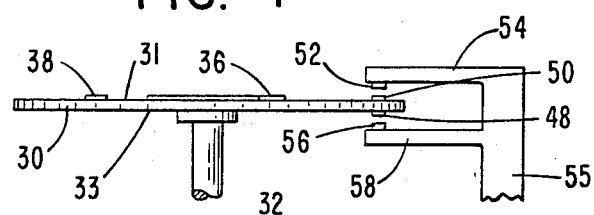
FIG. 4 is a schematic representation of a partial side view of the rotating member showing the stationary pick-up member.

Mounted along the edge of the disc member 30 and extending from the lower surface 33 of the member 30 are a number of light-emitting diodes 48 while extending from the upper surface 31 is a photodiode 50. The diode 50 coacts with a light-emitting diode 52 (FIG. 4) mounted on the upper arm portion 54 of a stationary support member 55 which in turn is mounted adjacent the rotating disc member 30. The diodes 50 and 52 provide timing signals to the IC chips 38-42 inclusive indicating the position of the disc member 30. A photodiode 56 mounted on a lower arm portion 58 of the support member 55 co-acts with the diodes 48 to provide binary signals representing the bar code data outputted by the IC chips 38-42 inclusive and the diodes 48. The number of diodes 48 required for each installation depends on the number of binary data bits in the data being sensed by the array 36. The diodes 48 and 50 are connected to the IC chips 38-42 inclusive by conductors (not shown) embedded in the disc member 30. The light-emitting diode 52 is connected to a power source (not shown) while the photodiode 56 is connected to a processing unit 70 (FIG. 6) in a manner to be described hereinafter.

Referring now to FIG. 6, there is shown a block diagram of the signal processing system in which the signals representing an image of the coded bars on the label 22 (FIG. 1) are transmitted from the array 36 over the bus 60 located on the rotating disc member 30 to the VSLI chips 62 which include the chips 38-42 inclusive (FIGS. 3 and 5). The chips 38-42 inclusive control the reading of the array and convert electrical signals outputted by the array 36 to binary signals which are transmitted to a transmit circuit 64 including the diodes 48 (FIGS. 3 and 5). The binary signals in the form of optical signals are transmitted through the diodes 48 and 56 to a receiving circuit 66 which may, if so desired, be located some distance away from the checkout counter and the scanning apparatus. As previously described, the diodes 50 and 52 (FIGS. 4 and 5) provide timing signals for clocking the output of the signals transmitted through the diodes 48 and 56.

The binary signals outputted by the receiving circuit 66 are transmitted through an interface 68 to the central processing unit 70 where the data is decoded and used to locate the price of the merchandise item purchased in a storage area such as a look-up table after which the price of the item is transmitted to a data terminal device (not shown) where it is displayed and printed in a manner that is well-known in the art.

It will be seen from the foregoing description that there is provided a scanning apparatus which can be mounted in a compact area of the check-out counter while allowing the data generated to be transmitted to a remote processing device.

Although only certain preferred embodiments of the present invention have been described herein, it is not intended that the invention be restricted thereto but that it be limited only by the true spirit and scope of the appended claims.

What is claimed is:

1. A system for scanning coded indicia comprising;
    means for providing a plurality of light beams for illuminating a coded indicia;
    rotating support means mounted in the path of the light beams reflected from the coded indicia;
    light receiving means mounted on said rotating support means for storing electrical signals in response to receiving the reflected light beams;
    circuit means mounted on said rotating support means and coupled to said light receiving means for reading and converting said electrical signals to binary data signals;
    processing means for processing said binary data signals to establish the data represented by the coded indicia scanned; and
    means coupled to said processing means and mounted adjacent said rotating support means for transferring the binary data signals stored by said light receiving means and converted by said circuit means, to said processing means.

2. The system of claim 1 in which said rotating support means comprises a disc member having parallel surfaces, said system further including a plurality of first transducer members coupled to said circuit means and mounted along the edge of one of the surfaces of the disc member for outputting signals representing the binary data signals, said transferring means including a first sensing member mounted adjacent the first signal transducer members for sensing the signals outputted by the transducer members whereby the signals sensed by the sensing member are transmitted to said processing means.

3. The system of claim 2 in which said transferring means further includes a stationary support member mounted adjacent the disc member and having a first arm portion extending in a direction parallel to said one of the surfaces of the disc member, said sensing member being mounted on said first arm portion adjacent the location of the first transducer members for sensing the signals outputted by said transducer members.

4. The system of claim 3 in which said transferring means further includes a second sensing member mounted along the edge of said disc member adjacent said first transducer members and coupled to said circuit means and a second transducer member mounted on said stationary support member for outputting a signal whereby said second sensing member will output a timing signal to said circuit means upon positioning of said second sensing member adjacent said second transducer member.

5. The system of claim 4 in which said support member includes a second arm portion extending in a direction parallel to the other surface of the disc member, said second transducer member being mounted on said second arm portion adjacent the location of said second sensing member on said disc member for enabling said second sensing member to sense the light output of said second transducer member.

6. The system of claim 5 which further includes a mirror mounted in the path of the reflected light beams for deflecting the light beams along a predetermined path and a lens member receiving the deflected light beams for focusing the light beams on the disc member.

7. The system of claim 5 in which the first and second arm portions extend in a direction parallel to each other.

8. The system of claim 2 in which the output of each of the first transducer members represent a binary bit.

9. The system of claim 2 in which said light receiving means comprises an array of chargecoupled devices.

10. In a check-out system including a checkout counter having a supporting surface including a transparent portion on which a merchandise item having a bar code label is positioned, a system for scanning the bar code label comprising;

means positioned adjacent the transparent portion of the supporting surface for projecting a plurality of light beams through the transparent portion for illuminating the bar code label positioned adjacent the transparent portion;

a rotating disc member mounted in a path of the light beams reflected from the bar code label;

a linear array of charge-coupled devices mounted on a disc member for generating first electrical signals representing an image of the bar code label in response to receiving the reflected light beams;

a plurality of circuit members mounted on said rotating disc member and coupled to said charge-coupled devices for reading and converting the first electrical signals to binary data signals;

a plurality of first light-emitting diodes mounted on one side of said rotating disc member and enabled by said circuit members to output signals representing said binary data signals;

a stationary support member mounted adjacent to the rotating disc member and having a first arm portion extending in a direction parallel to and adjacent said one side of said disc member;

a first light sensing member mounted on said first arm portion adjacent the light-emitting diodes to generate second electrical signals representing the binary data; and processing means coupled to said light sensing member for processing said second electrical signals to identify the data represented by the bar code label.

11. The system of claim 10 which further includes:

a second light sensing member mounted on the other side of said rotating disc member and coupled to said circuit members;

said stationary support member including a second arm portion extending in a direction parallel to and adjacent the other side of said rotating disc member; and a second light-emitting diode mounted on the second arm portion and adjacent said second light sensing member whereby upon each revolution of said rotating disc member, said second light sensing member outputs a timing signal to said circuit members in response to sensing the light output of said second light emitting diode.

* * * * *